(12) United States Patent
Duffield et al.

(10) Patent No.: US 6,912,232 B1
(45) Date of Patent: Jun. 28, 2005

(54) VIRTUAL PRIVATE NETWORK

(75) Inventors: Nicholas G. Duffield, Hoboken, NJ (US); Albert G. Greenberg, Millburn, NJ (US); Pawan Goyal, Mountain View, CA (US); Partho P. Mishra, Summit, NJ (US); Kadangode K. Ramakrishnan, Berkeley Heights, NJ (US); Jacobus Erasmus van der Merwe, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/420,565

(22) Filed: Oct. 19, 1999

Related U.S. Application Data

(60) Provisional application No. 60/113,497, filed on Dec. 22, 1998, and provisional application No. 60/104,756, filed on Oct. 19, 1998.

(51) Int. Cl.$^7$ ................ H04J 3/16; H04J 3/22
(52) U.S. Cl. ............. 370/468; 370/231; 370/232; 370/235; 370/238; 370/395.21; 370/252; 370/401; 370/409
(58) Field of Search ................. 370/231, 232, 370/233, 234, 235, 252, 401, 468, 238, 237, 409, 395.21, 400, 395.42, 395.51, 230, 399

(56) References Cited

U.S. PATENT DOCUMENTS

| | | | |
|---|---|---|---|
| 5,623,492 A | | 4/1997 | Teraslinna |
| 5,706,279 A | | 1/1998 | Teraslinna |
| 5,768,271 A | | 6/1998 | Seid |
| 5,812,525 A | | 9/1998 | Teraslinna |
| 5,953,338 A | * | 9/1999 | Ma et al. ............ 370/395.21 |
| 5,999,514 A | * | 12/1999 | Kato ..................... 370/231 |
| 6,097,722 A | * | 8/2000 | Graham et al. ........ 370/395.21 |
| 6,169,748 B1 | * | 1/2001 | Barbas et al. ............ 370/468 |
| 6,272,110 B1 | * | 8/2001 | Tunnicliffe et al. ....... 370/232 |
| 6,331,986 B1 | * | 12/2001 | Mitra et al. ............. 370/468 |
| 6,366,563 B1 | * | 4/2002 | Weldon et al. ........... 370/252 |
| 6,430,619 B1 | * | 8/2002 | Sitaraman et al. ........ 709/225 |
| 6,504,819 B2 | * | 1/2003 | Fowler et al. ............ 370/230 |

* cited by examiner

*Primary Examiner*—Wellington Chin
*Assistant Examiner*—Chuong Ho

(57) ABSTRACT

The invention provides apparatus and methods for a Virtual Private Network (VPN) in a network that offers a simple user interface for efficient utilization of network resources. The VPN is defined for a specified set of endpoints each of which is associated with a single "hose." A hose provides access to the VPN through an access point which may be a node of the network, for example. The hose is a single interface to the VPN for communication to all other endpoints of the VPN. The VPN achieves network resource allocation efficiency by exploiting resource sharing possibilities via multiplexing routing paths between endpoints and dynamic resource allocation techniques that permit real time resource allocation resizing. When a VPN is established with a VPN service provider, the routing paths between the endpoints of the VPN is optimized for multiplexing opportunities so that resource allocations between nodes along routing paths within the IP network is reduced to a minimum.

30 Claims, 9 Drawing Sheets

VIRTUAL PRIVATE NETWORK

This non-provisional application claims the benefit of U.S. Provisional Application No. 60/113,497, entitled "PERFORMANCE ORIENTED SERVICE INTERFACE FOR VIRTUAL PRIVATE NETWORKS" filed on Dec. 22, 1998 and U.S. Provisional Application No. 60/104,756, entitled "VIRTUAL PRIVATE NETWORK" filed on Oct. 19, 1998. The Applicants of the provisional applications are Nicholas G. Duffield, Pawan Goyal, Albert Gorder Greenberg, Partho Pratim Mishra, Kadangode K. Ramakrishnan, and Jacobus E. van der Merwe. The above provisional applications and "A FLEXIBLE MODEL FOR RESOURCE MANAGEMENT IN VIRTUAL PRIVATE NETWORKS" by Duffield, Goyal, Greenberg, Mishra, Ramnakrishnan and van der Merwe are hereby incorporated by reference including all references cited therein.

BACKGROUND OF THE INVENTION

1. Field of Invention

The present invention relates to methods and apparatus for virtual private networks.

2. Description of Related Art

A private line network provides communications with guaranteed performance because entities that are connected to the private line network are limited to only those parties that communicate with one another. In addition, the private line network provides a level of inherent security because parties other than the communicating parties cannot gain access to the network.

The above advantages are counter balanced by inflexibility (e.g., adding new endpoints requires new network upgrades), and network resources are determined by peak traffic conditions. Moreover, interfacing to private line networks is complex because detailed knowledge about the network is required, including particularities regarding endpoints and connectivity to the endpoints. Thus, there is a need for new technology to provide private line network service without the above mentioned drawbacks.

SUMMARY OF THE INVENTION

The invention provides apparatus and methods for a Virtual Private Network (VPN) in a network such as an Internet Protocol (IP) Network that offers a simple user interface for efficient utilization of network resources. The VPN is defined for a specified set of endpoints, each of which is associated with a single "hose." A hose provides access to the VPN through an access point which may be a node of the network such as a server, a router or an Internet Service Provider (ISP), for example. The hose is a single interface for a user or "customer" to the VPN for communication to all other endpoints of the VPN.

Customers of the VPN are relieved of the burden to obtain detailed knowledge of the VPN. To interface with the VPN, each customer is only required to specify a hose profile of the hose associated with the customer's endpoint. The hose profile may be an aggregate communication specification such as bandwidth or other quality of service requirements or more detailed description of the desired communication traffic characteristics. The VPN guarantees communication performance up to the hose profile for each of the endpoints.

The VPN achieves network resource allocation efficiency by exploiting resource sharing possibilities via multiplexing routing paths between endpoints and dynamic resource allocation techniques that permit real time resource allocation resizing. When a VPN is established with a VPN service provider, the routing paths between the endpoints of the VPN is optimized for multiplexing opportunities so that resource allocations between nodes along routing paths within the IP network is reduced to a minimum. In addition, while initial resource allocations may be dictated by worst case requirements of the hose profiles associated with the endpoints, real time measurement of actual VPN traffic allows adaptive resizing of network resource allocations so that initially allocated network resources may be applied to other uses that would otherwise be wasted. Thus, network resource allocations for the VPN achieves significant gains over private line networks.

The VPN service provider may achieve further allocation efficiency by exploiting multiplexing possibilities across multiple VPNs and resource sharing possibilities with other non-VPN communication traffic. In this way, VPN customers not only are relieved of the need for detailed network expertise, but also gain significant cost savings due to network resource utilization efficiencies not possible with private link networks.

BRIEF DESCRIPTION OF THE DRAWINGS

The invention is described in detail with reference to the following figures wherein like numbers designate like elements, and wherein.

DETAILED DESCRIPTION OF PREFERRED EMBODIMENTS

Figure 1:
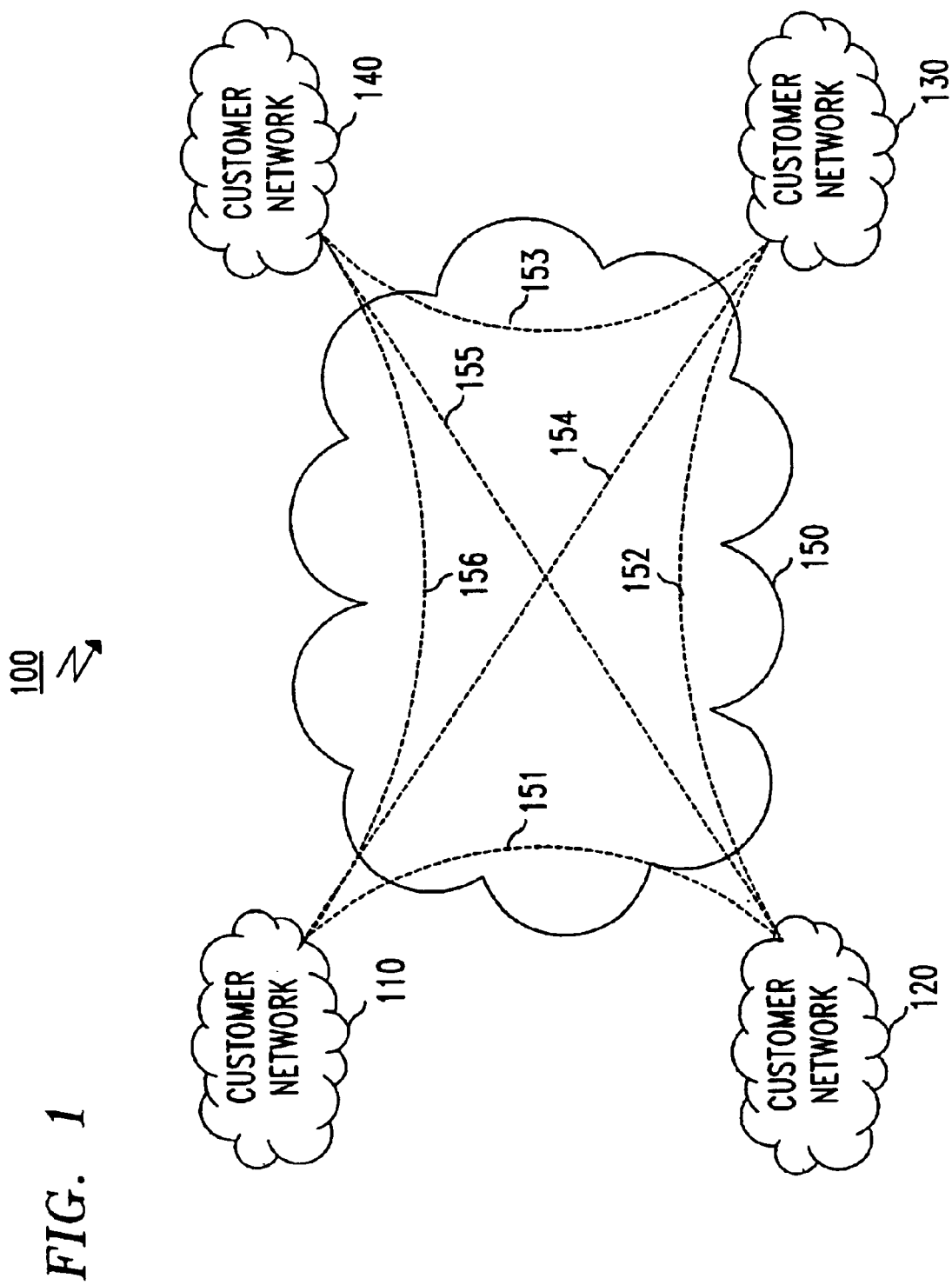
FIG. 1 is an exemplary block diagram of a VPN emulating a private line network.

FIG. 1 shows an example of a VPN 150 operating in a network system 100 that provides a private line network service in a network 150. Customer networks 110–140 are VPN endpoints that communicate with one another via the network 150. In the network system 100, each customer network 110–140 must allocate a set of customer communication links 151–156 between pairs of source-destination endpoints and specify communication link parameters such as bandwidth, packet delay, etc.

In the above VPN, the customer networks 110–140 bear the burden for network resource allocation and, thus, operators of the customer networks 110–140 must have precise knowledge of the amount of traffic flowing among the endpoints to the VPN to set desired bandwidth and quality of service (QOS). Once allocated, network resources such as bandwidth of nodes within the network 150 that are assigned for each communication link 151–156 cannot be used for other communications even when not in use for the intended VPN. Thus, inefficiencies in network resource utilization results which reduces an ability of the network 150 to support a volume of communication that might otherwise be supported.

Figure 2:
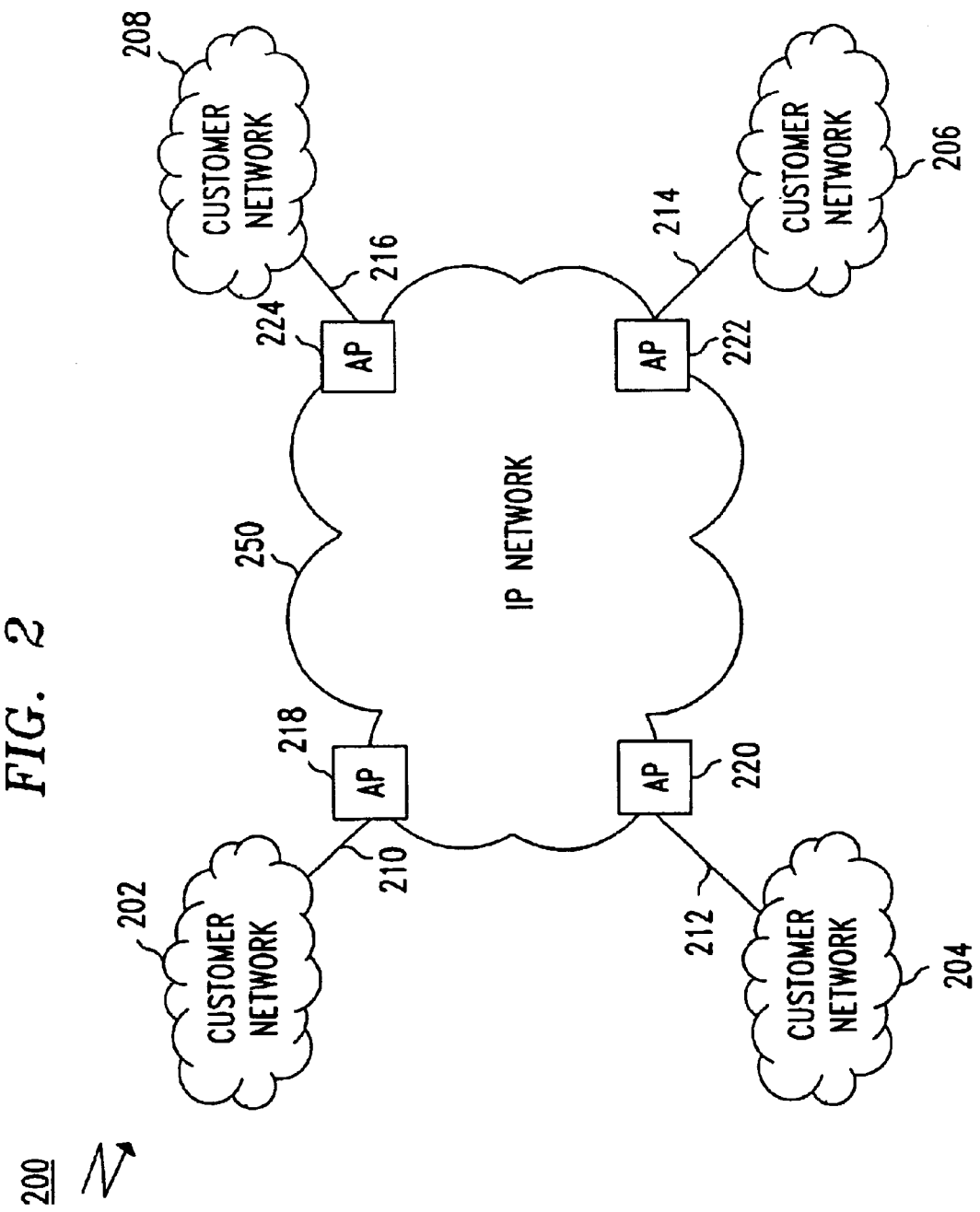
FIG. 2 is an exemplary block diagram of a hose VPN.

FIG. 2 is an exemplary diagram of a hose VPN system 200 that includes hoses 210–216 to a VPN and a network 250. The network may be of any kind such as a switched network, an asynchronous transfer network (ATM), or other data or analog networks. For the following discussion, the Internet Protocol (IP) network is used as an example.

The IP network 250 includes a plurality of access points 218–224 where each of the access points 218–224 is associated with one of the hoses 210–16. The hose VPN system 200 provides VPN services to customer networks 202–208 and each of the customer networks 202–208 gains access to the VPN via one of the hoses 210–216, for example.

The customer networks 202–208 may be any customer proprietary network such as a local area network (LAN) (e.g., an Internet Service Provider (ISP)), wide area network (WAN), or the like. While FIG. 2 shows customer networks 202–208, any communication device capable of establishing a communication connection with the access points 218–224 may be used in place of or in conjunction with the customer networks 202–208 without departing from the spirit and scope of the invention.

The customer networks 202–208 access the VPN (i.e., utilize VPN service) through a respective access point 218–224. The access points 218–224 are coupled to each other via communication links within the IP network. The access points 218–224 may be any type of device or system that provides access to the IP network 250. For example, the access points 218–224 may be Internet Service Providers (ISPs), network servers, routers, or the like.

A hose 210–216 provides access to a VPN that is supported by the IP network 250. When associated with the same VPN, the hoses 210–216 are endpoints of the VPN. Thus, each of the customer networks 202–208 communicates via one hose 210–216 to any of the other endpoints (i.e., other customer networks 202–208 that are also part of the same VPN). Each hose 210–216 is specified by a service level agreements (SLA) without reference to other endpoints. Once agreed, the VPN guarantees performance of the hose 210–216 independent of a type or destination of communication traffic of the hose 210–216 as long as the communication traffic remain within the SLA. Thus, a customer network 202–208 (or an operator of the customer network 202–208) need not specify performance for each of the endpoints that may be a destination. Rather, the customer network 202–208 only provide the SLA for its hose 210–216 and the VPN performs the functions required to meed the SLA.

Accordingly, once SLAs for all hoses 210–216 of a VPN are completed, the VPN is specified and the IP network 250 guarantees the performance such as connectivity and bandwidth required to meet the SLAs. In this way, operators of the customer networks may be relieved of tasks associated with routing, network management, network performance, etc. In addition, the IP network 250 may be optimized to utilize resource sharing by multiplexing communication paths within each VPN and across multiple VPNs as well as take advantage of available resources supporting non-VPN communications.

SLAs for each of the hoses 210–216 may be based on one or more QOS requirements. For example, the hose 210 may have an SLA that requires three QOS levels of. QOS A, QOS B and QOS C. In addition, a time schedule may be associated with each of the QOS levels so that the level of support may be varied with time. For example, QOS A may require 10 megabits per second (mb/s) constant bit rate to support real time video communication, QOS B may require support for 5 mb/s file transfer protocol (ftp) data transfers while QOS C may require 56 kilobits per second (kb/s) for e-mail. Also, QOS A may be needed only during working hours from 8 a.m. to 5 p.m., Monday through Friday, while QOS B may be needed for afternoon and evening hours between 1 p.m. and 8 p.m. and QOS C may be always required. All of the above requirements are collected together as a hose profile corresponding to each hose 210–216. The VPN service provider guarantees that the hose profile is met for each of the hoses 210–216 of the VPN. The SLA for hoses 210–216 may be based on traffic characteristics such as reasonable delay, packet loss rates, jitter, bandwidth minimums, and the like for various time periods. For example, an IP voice VPN service provider might require tight bounds on the per-packet loss rates, delay and possibly the amount of jitter. On the other hand, a data only VPN service provider might have relatively less stringent delay requirements. Also, as mentioned earlier, these requirements may be needed only for certain time intervals and may be relaxed during other time intervals.

The interface between the customer networks 202–208 and the associated hoses 210–216 may be managed by either the customer or the VPN service provider. If the VPN is established for a single QOS, then the management task is reduced to guaranteeing an effective bandwidth among all the access points 218–224 of the VPN. While QOS may be specified in terms of bandwidth, end-to-end delay, bit rate, error rate, etc., all of these qualities may be reduced to an effective bandwidth which the VPN service provider guarantees for each of the hoses 210–216.

For example, if a VPN is established between customer networks 202 and 208 and the associated hoses 210 and 216 are specified to require a 10 mb/s for each direction, the VPN service provider may satisfy the above VPN requirements by allocating 10 mb/s bandwidth in the access points 218 and 224 as well as 10 mb/s duplex connections between the access points 218 and 224. Assuming that a shortest path between the access points 218 and 224 traverses three nodes of the IP network, the VPN service provider must allocate 10 mb/s of bandwidth in each of these nodes for both directions.

While the above simple VPN may appear to be supported by forming a pipe between the access points 218 and 224 without any multiplexing opportunities, the VPN service provider may take advantage of resource sharing between the resources allocated for the VPN and resources devoted for other non-VPN communications. For example, while 10 mb/s may be initially allocated for each direction to support a VPN, the network resource allocations may be resized based on actual VPN traffic experienced between the access points 218 and 224. In this way, the IP network resources may be adaptively allocated so that un-utilized resources may be devoted for other IP network communications.

The VPN management task becomes much more difficult when multiple QOS levels are desired. For these more complex management situations, the management of the customer network interface may be divided into four cases as shown in Table 1 below. Cases land 2 correspond to customer managed hoses 210–216 and cases 3 and 4 correspond to VPN service provider managed hoses 210–216.

In case 1, the customer may manage the outgoing hose traffic by controlling the rate of data packets output through the hoses 210–216 from different applications based on a priority scheme. Thus, higher priority applications may output more data packets than lower priority applications. After the data packets enter the hoses 210–216, the data packets are not distinguished from each other but are only identified by a VPN identification (ID), for example. Thus, for case 1, the VPN service provider does not distinguish one data packet from another within a single VPN, but only distinguishes one VPN from another. Thus, for case 1, the VPN service provider may only take advantage of potential multiplexing opportunities based on a single effective bandwidth hose profile. Other techniques may also be used such as weighted fair queuing so that different applications within the customer network may be assigned different weights and data packets from each application are allocated bandwidths through the hoses 210-216 based on the associated weights.

TABLE 1

Customer Network Interface

|  | Customer, Managed | VPN Service Provider Managed One VPN for each QOS |
|---|---|---|
| Hose Input Scheduling | Case 1 Customer controls the volume of packets from applications based on priority or weighted fair queuing techniques, for example. | Case 3 Customer assigns applications to appropriate VPNs. The VPN service provider schedules customer communication traffic based on the QOS and VPN. |
| Packet Marking | Case 2 Customer marks data packets. Network processes marked data packets up to the hose profile. | Case 4 Customer and VPN service provider mark packets. Customer markings are honored as long as hose profile is met. Can optimize across VPNs having same QOS within the network. |

In case 2, the customer manages the communication traffic through the hoses 210–216 by marking individual data packets. For example, each data packet is marked corresponding to the QOS assigned to the corresponding application. All the marked data packets are output to the hoses 210–216 and the VPN service provider processes the data packets based on the mark of each data packet. The VPN service provider will process all the marked data packets up to the hose profile. Data packets output through the hoses 210–216 that exceed the hose profile, may be dropped or handled in a best effort manner which may be specified in the hose profile.

Figure 3:
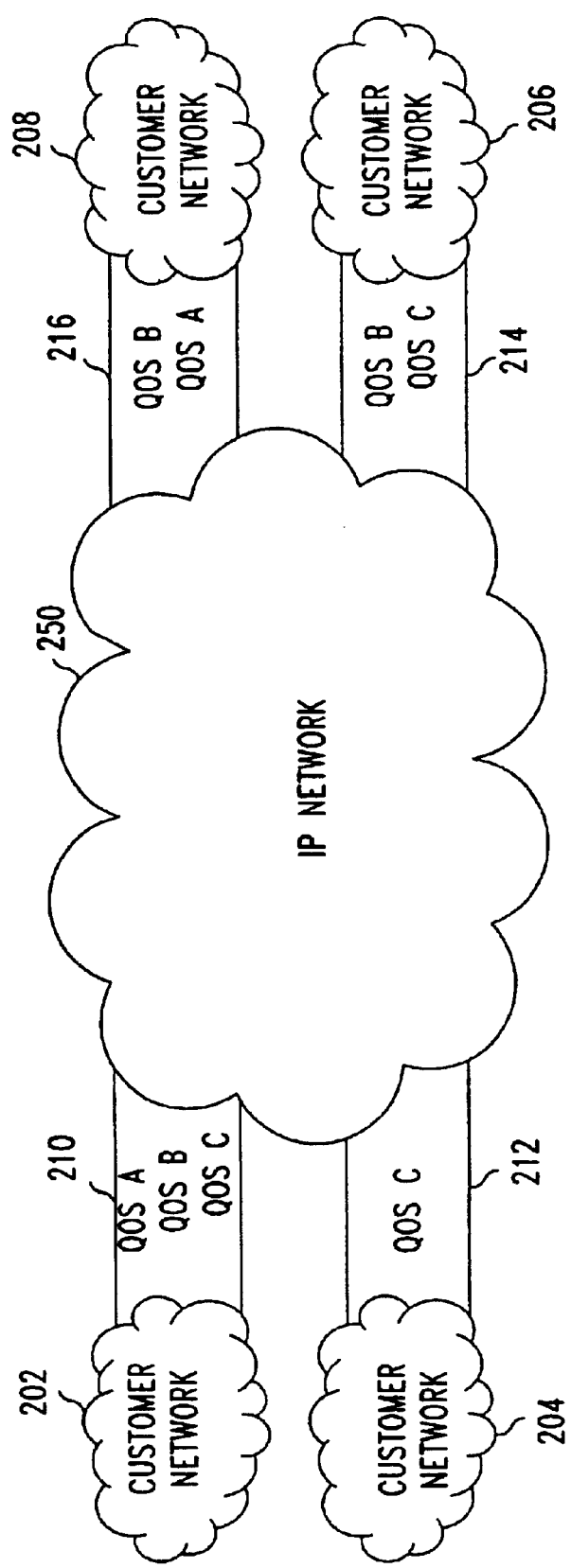
FIG. 3 is an exemplary diagram of a customer managed hose VPN.

FIG. 3 shows a diagram illustrating a VPN having customer managed hoses. Each of the customer networks 202–208 may independently define the hose profile for its respective hose 210–216. For example, the customer network 202 has a hose profile that has requirements for QOS A, QOS B and QOS C data packets while the hose profile for the hose 216 specifies requirements for QOS A and QOS B data packets. Similarly, a hose profile for the hose 212 specifies requirements for QOS A and QOS C data packets while a hose profile for the hose 214 specifies requirements for QOS B and QOS C data packets. If the customers use hose input scheduling, the desired communication performance is managed by the customer networks 202–208 allocating the hose bandwidth to its applications. The VPN guarantees the aggregate effective bandwidth specified in each of the hose profiles. If data packet marking is used as in case 2, the data packets are marked as QOS A, QOS B or QOS C and the VPN service provider handles the data packets according to the effective bandwidth specified in the hose profiles.

In case 3, the VPN service provider manages the hoses by defining a separate VPN for each QOS level. The customer networks 202–208 merely assign the appropriate VPN to applications that require the QOS level guaranteed by that VPN. Thus, the customer networks 202–208 do not perform any scheduling but rather output data packets of different QOS levels to respective VPNs.

In case 4, the VPN service provider establishes various VPNs corresponding to the QOS levels required and the customer networks 202–208 mark each of the data packets corresponding to the QOS level. In this case, the VPN service provider honors the markings of the data packets until the hose profile is reached. For example, if the customer network 202 marks a data packet to be QOS A, the VPN service provider transmits the data packet in the QOS A VPN until the QOS A hose profile is reached. QOS A marked data packets that exceed the hose profile may be given lower priority or best effort performance depending on network conditions. In some situations, the hose profile may specify burst traffic conditions where for a prespecified amount of time, the bandwidth may exceed a base level by some predetermined amount. In this situation, QOS level markings of data packets are ignored only when the burst condition parameters of the hose profile are exceeded. Thus, the VPN service provider is policing the flow to ensure that marking apply only to communication traffic within the hose profile.

Figure 4:
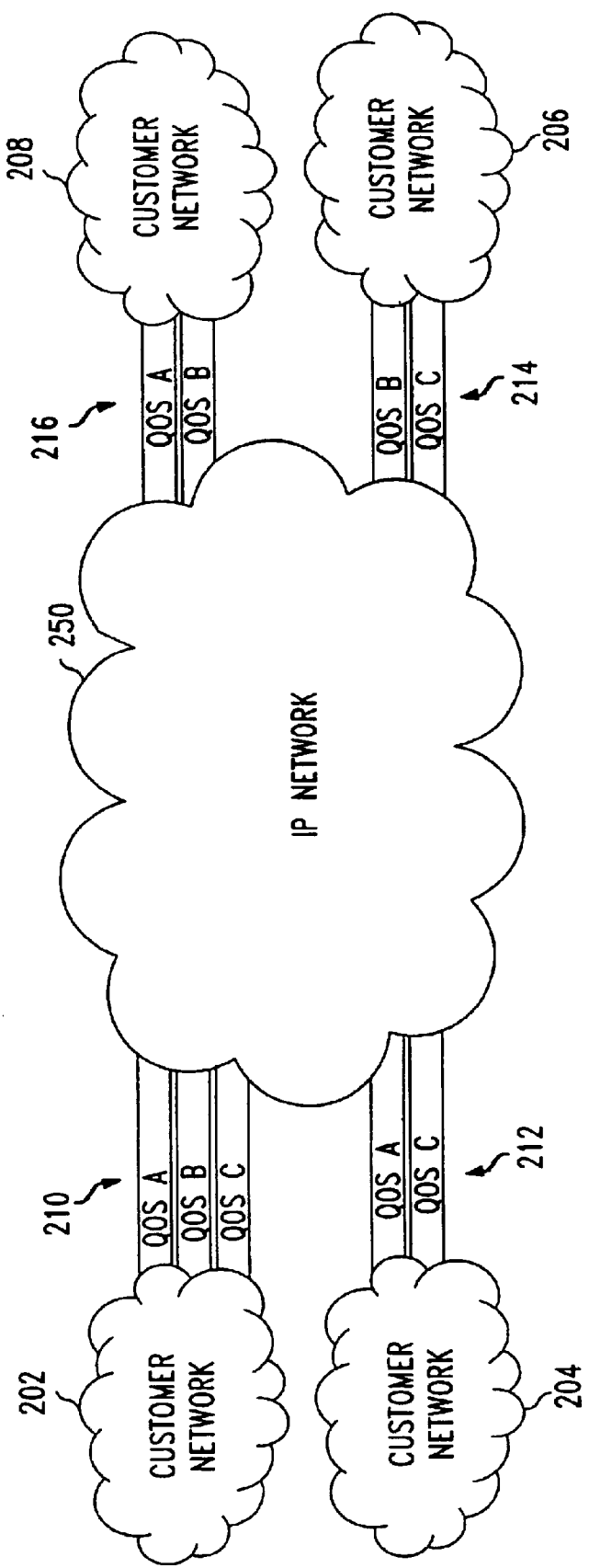
FIG. 4 is an exemplary diagram of a VPN service provider managed hose VPN.

FIG. 4 shows a VPN that corresponds to the VPN shown in FIG. 3 with the exception that the VPN shown in FIG. 4 is a service provider managed VPN. Because the customer network 202 requires three QOS levels, the hose 210 includes three sub-hoses, one sub-hose corresponding to each of the QOS levels A, B and C. Similarly, the other hoses 212–216 may include sub-hoses for the corresponding QOS levels specified by each of the respective customer networks 204–208.

The VPN shown in FIG. 3 provides benefits for the customer networks 202–208 because the specification of the hose profile is simplified. The simplification is achieved because the customer networks 202–208 are required only to specify aggregate hose profiles instead of a specific hose profile for each QOS level. However, because only the aggregate hose profile is provided, the VPN service provider has less opportunity to take advantage of possible multiplexing than if more specific hose profile specifications were provided. Thus, the VPN service provider may be forced to allocate (at least initially) the maximum required bandwidths to guarantee the hose profile required performances.

In contrast, in the VPN shown in FIG. 4, the customer provides the VPN service provider bandwidth information required for each of the desired QOS levels for each of the endpoints. Thus, multiplexing among endpoints of each VPN may be achieved as well as resource sharing may be exploited across the VPNs allocated to all the QOS levels to reduce IP network resource allocations.

The VPN service provider may allocate network resources based on network optimization options as shown in Table 2 below. There are three possible network optimization strategies: 1) pipe; 2) source/sink tree; and 3) total VPN. As shown in Table 2, the degree of multiplexing ranges from low to high as discussed below.

TABLE 2

Network Optimization Options

| Network Strategy | Degree of Multiplexing |
| --- | --- |
| Pipe | Low |
| Source/Sink Tree | Medium |
| Total VPN | High |

Figure 5:
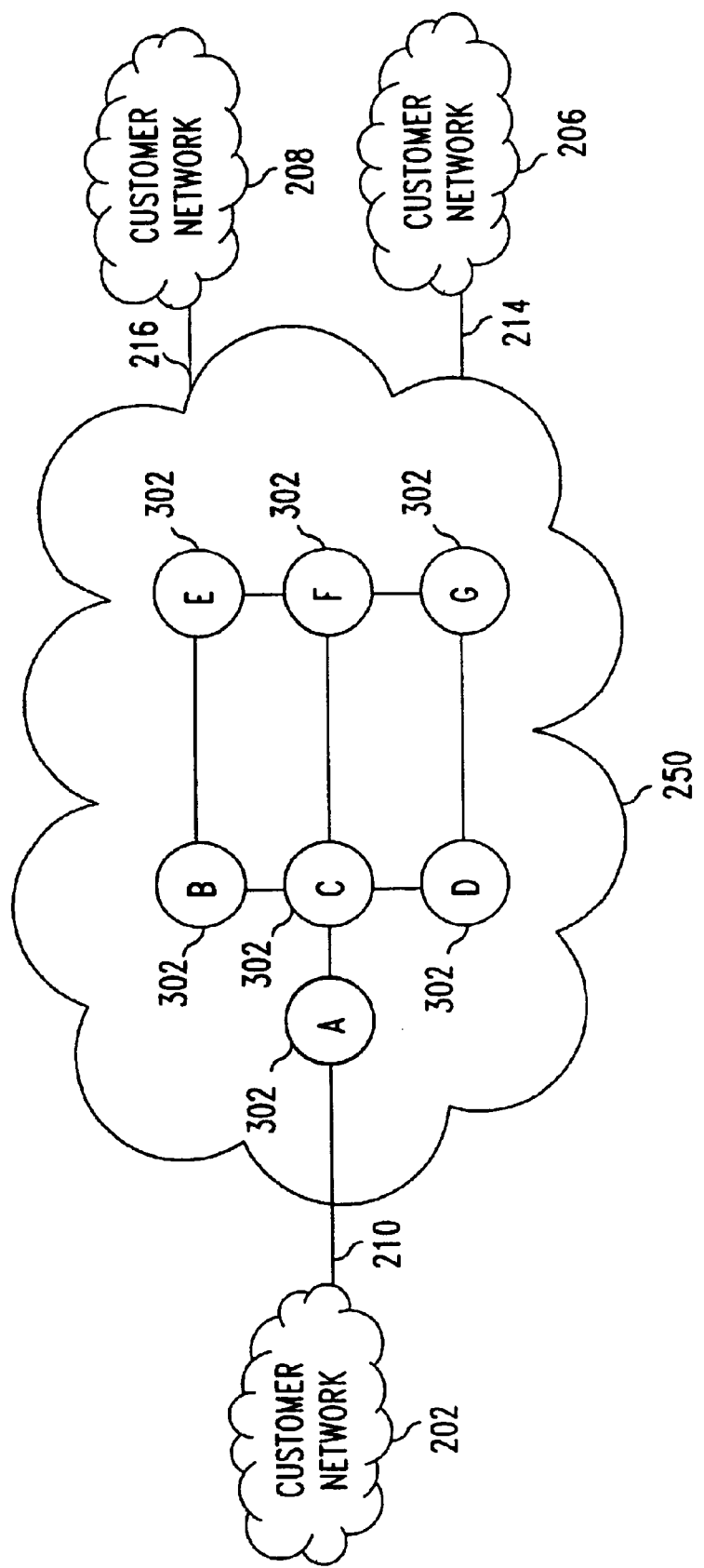
FIG. 5 is an example of a set of network nodes connecting endpoints of a VPN.

FIG. 5 shows an example of a virtual network having customer networks 202, 206 and 208 connected to hoses 210, 214 and 216 as endpoints. For discussion purposes, assume that nodes 302 labeled A–G are allocated for the above VPN.

Table 3 below shows the pipe network optimization in terms of the nodes A–G. Assume that the hose profile corresponding to each of the hoses 210–216 requires 1 mb/s for communication between the customer network 202 to the customer network 208 and between the customer network 202 and the customer network 206. If the shortest routing path between the customer networks 202 and 208 is via nodes A-C-B-E then the total bandwidth allocation in the network may be represented by the sum of the bandwidths between each adjacent node. Thus, the bandwidth between nodes A and C is 1 mb/s; the bandwidth between nodes C and B is 1 mb/s; and the bandwidth between nodes B and E is 1 mb/s. Thus, the network resource allocation between the customer network 202 and customer network 208 is 3 mb/s.

TABLE 3

Pipe Network Optimization

| Endpoints | Bandwidth | Shortest Routing Path | Allocation | Total Allocation |
| --- | --- | --- | --- | --- |
| A → E | 1 mb/s | A → C → B → E | 3 mb/s | 6 mb/s |
| A → G | 1 mb/s | A → C → D → G | 3 mb/s | |

Similar to the above, the network resource allocation between the customer networks 202 and 206 is 3 mb/s for the routing path of A-C-D-G. Thus, the total network resource allocation to support the hose profile for the hose 210 is 6 mb/s.

The above pipe network optimization basically allocates the maximum bandwidth required as if a pipe is constructed between nodes A and E and between nodes A and G. While initial bandwidth allocation may be 6 mb/s, the VPN service provider may monitor the actual VPN traffic and "resize" the network resource allocations based on the monitoring result. In this way, the network resource allocation may be adjusted to track the actual bandwidth usage for the VPN and adaptively adjust the network allocations accordingly.

In addition, the VPN service provider may share network resources with other non-VPN communication traffic so that when network resources allocated to the VPN are not used, the VPN service provider may utilize the allocated network resources for other purposes. For example, the unused network resources may be used for best effort IP network traffic until those resources are required to guarantee VPN performance.

Table 4 below shows an example of a first source tree network optimization. A source tree is a tree of connecting paths that emanate from a source hose 210–216 to a destination hose 210–216. For example, the source tree for the hose 210 originates from node A and extends to node C. If the shortest routing path is assumed, the source tree branches at node C to nodes B and D. The node B branch continues to node E while the node E branch continues to node G. This source tree obviates the fact that the branch A–C is common between the two branches C–B and C–D. Because the common branch A–C is only required to support the bandwidth allocated to the source, the hose 210, the bandwidth allocation for the branch A–C does not need to exceed the hose profile of the hose 210. Thus, as shown in Table 4, the network resource allocation may be 3 mb/s for the source tree branches A-C-B-E and 2 mb/s for the branches C-D-G. The total bandwidth allocation is 5 mb/s which is 1 mb/s less than the pipe network optimization of Table 3. Thus, the bandwidth gain of the source tree network optimization over the pipe network optimization is 6/5 or 1.2.

TABLE 4

First Source Tree Network Optimization

| Endpoints | Bandwidth | Shortest Routing Path | Allocation | Total Allocation |
| --- | --- | --- | --- | --- |
| A → E | 1 mb/s | A → C → B → E | 3 mb/s | 5 mb/s |
| A → G | 1 mb/s | → D → G | 2 mb/s | |

Table 5 below shows a second source tree network optimization that takes advantage of an explicit routing path instead of relying on the shortest routing path. For example, instead of routing data packets through branches C-B-E and C-D-G, the data packets are routed through branches C-F-E and C-F-G, the branch between nodes C and F become common for the tree source between the hose 210 to the hose 216 and the hose 210 to the hose 214. Since the branches A–C and C–F of the source tree are required to support only the hose profile for hose 210, the bandwidth allocation for the branches A–C and C–F are 1 mb/s each. The remaining allocations are for the branches F–E and F–G which are both limited to the hose profiles for the hoses 216 and 214, respectively, and are both 1 mb/s. Thus, the total bandwidth allocation for the second source tree network optimization is 4 mb/s. Accordingly, the gain of the second source tree network optimization over the pipe network optimization is 6/4 or 1.5.

TABLE 5

Second Source Tree Network Optimization

| Endpoints | Bandwidth | Explicit Routing Path | Allocation | Total Allocation |
| --- | --- | --- | --- | --- |
| A → E | 1 mb/s | A → C → F → E | 3 mb/s | 4 mb/s |
| A → G | 1 mb/s | → G | 1 mb/s | |

The above source tree network optimizations take advantage of the ability to multiplex branches of the source tree for communication traffic destined to different endpoints. Thus, the branch A–C is multiplexed between the communication traffic between the hose 210 to the hose 216 and between the hose 210 and the hose 214. Similarly, the second source tree network optimization multiplexes both the A–C branch and the C–F branch between the hose 210 to the hose 216 and the hose 210 to the hose 214 communication traffic.

Table 6 below shows a total VPN allocation for the second source tree optimization where all possible VPN communication traffic is included. The first row of table 6 shows the communication traffic between the hose 210 and the hoses 214 and 216, the second row shows the communication between the hose 216 and the hoses 210 and 214 and the third row shows the communication between the hose 214 and the hoses 210 and 216. As before, if the explicit routing path of the above second source tree network optimization is used, the total network allocation is 4 mb/s for each of the above hoses 210–216 which results in a total network allocation of 12 mb/s.

TABLE 6

Total VPN Allocation for Second Source Tree Optimization

| Endpoints | Bandwidth | Explicit Routing Path | Allocation | Total Allocation |
|---|---|---|---|---|
| A → E | 1 mb/s | A → C → F → E | 3 mb/s | 12 mb/s |
| A → G | 1 mb/s | → G | 1 mb/s | |
| E → A | 1 mb/s | E → F → C → A | 3 mb/s | |
| E → G | 1 mb/s | → G | 1 mb/s | |
| G → A | 1 mb/s | G → F → C → A | 3 mb/s | |
| G → E | 1 mb/s | → E | 1 mb/s | |

Table 7 below shows a VPN network optimization where further multiplexing may be exploited. If the network resource allocation is first performed for satisfying the hose profile for the hose 210 (row 1), then path A-C-F-E is allocated for communication traffic between the hose 210 and the hose 216 and an additional allocation for path F–G is needed for communication traffic between the hose 210 and the hose 214. This allocation is identical with the allocation for the second source tree network optimization which takes advantage of multiplexing along paths A–C and C–F. In row 2, the allocation for the communication traffic from the hose 216 to the hose 210 requires 1 mb/s for each of the paths E-F-C-A. The allocation for the communication traffic between the hose 216 and the hose 214 requires the paths E–F and F–G. However, the path E–F may be multiplexed between the communication traffic of the hose 216 to the hose 210 and the hose 216 to the hose 214. Similarly, the path F–G may be multiplexed between the traffic from the hose 216 to the hose.214 and the hose 210 to the hose 214 as shown in row 1. Thus, the allocation for the path between F to G that was allocated in the second source tree optimization is not necessary. Those not allocated are shown in bold and italicized.

TABLE 7

VPN Network Optimization

| Endpoints | Bandwidth | Explicit Routing Path | Allocation | Total Allocation |
|---|---|---|---|---|
| A → E | 1 mb/s | A → C → F → E | 3 mb/s | 8 mb/s |
| A → G | 1 mb/s | → G | 1 mb/s | |
| E → A | 1 mb/s | E → F → C → A | 3 mb/s | |
| E → G | 1 mb/s | → G | | |
| G → A | 1 mb/s | G → F → C → A | 1 mb/s | |
| G → E | 1 mb/s | → E | | |

As shown in row 3, further multiplexing may be achieved for the communication traffic between the hose 214 and the hoses 210 and 216. Aside from the path G–F that is required to guarantee the hose profile corresponding to the hose 214, the remaining paths may be multiplexed between the communication traffic from the hose 214 to the hose 210 and the communication traffic from the hose 216 and the hose 210 as well as the communication between the hose 210 and the hose 216. Thus, the additional bandwidth allocation to support the hose profile corresponding to the hose 214 is only 1 mb/s. Accordingly, the total resource allocation for the VPN network optimization is 8 mb/s. Thus, the VPN network optimization has a gain of 3 over the pipe network optimization.

Figure 6:
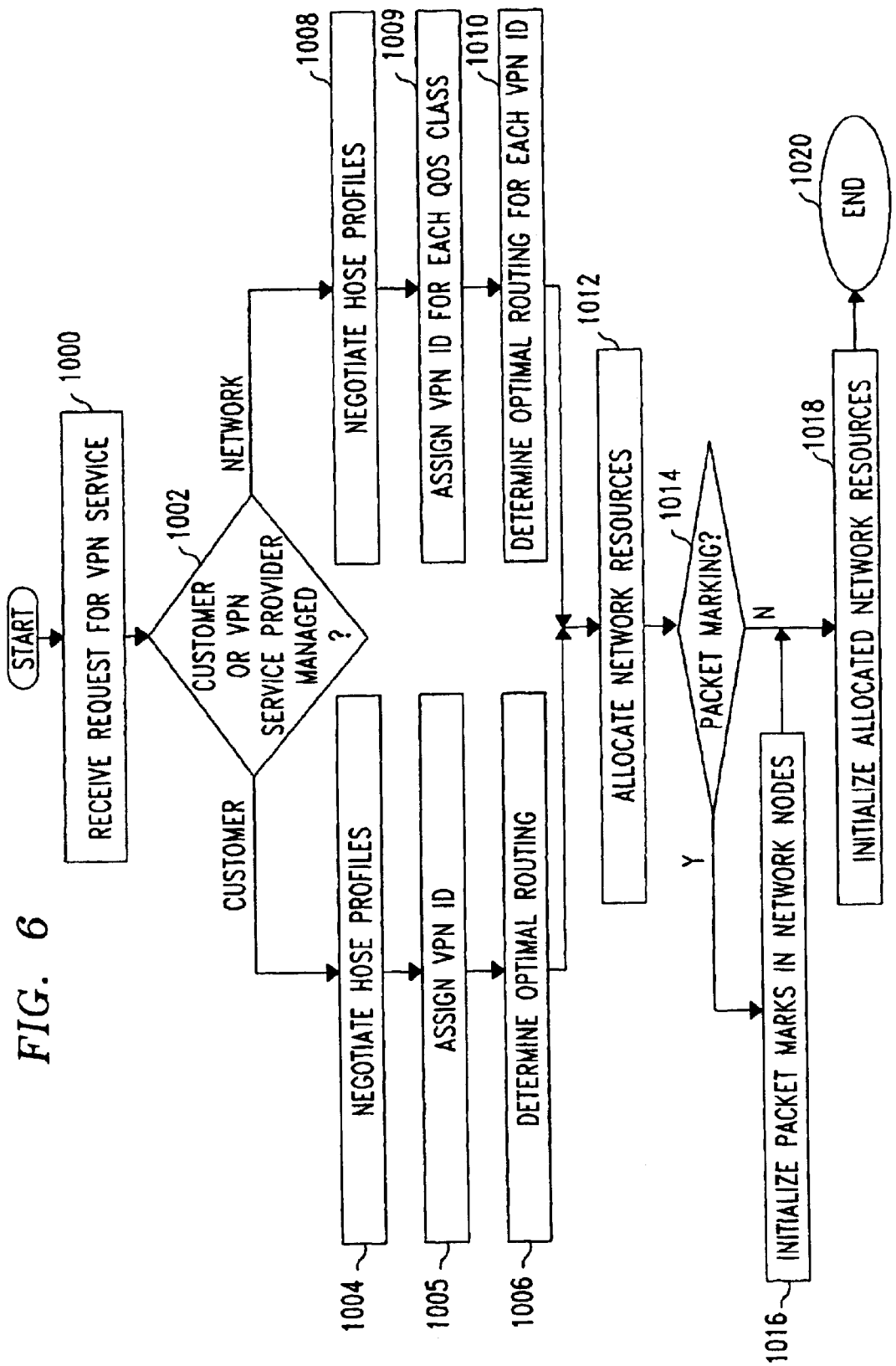
FIG. 6 is a flow chart of an exemplary process for allocating and initializing a hose VPN.

FIG. 6 shows a flow chart for an exemplary process to initially allocate network resources for a hose VPN. In step 1000, a request is received for VPN service and the process goes to step 1002. In step 1002, it is determined whether allocation of hose resources should be customer managed or VPN service provider managed. If customer managed, the process goes to step 1004; otherwise, the process goes to step 1008. In step 1004, the VPN service provider negotiates hose profiles with the customer (or with each of the customer networks 202–208). Such negotiations may be conducted automatically via currently available or future protocols or may be negotiated between the VPN service provider business entity and the customer business entity. The negotiations may consider tradeoffs between QOS desired and costs incurred, for example. After the hose profiles are determined, the process goes to step 1005. In step 1005, the VPN service provider assigns a VPN identification (ID) to the requested VPN and goes to step 1006. In step 1006, the VPN service provider determines optimal routing to guarantee the required services as specified in the hose profiles and goes to step 1012.

In step 1008, the VPN service provider negotiates hose profiles for each of the QOS classes desired and goes to step 1009. In step 1009, the VPN service provider assigns VPN IDs for each of the QOS classes and goes to step 1010. In step 1010, the VPN service provider determines the optimal routing for each of the VPNs. For example, the VPN service provider may consider any multiplexing that may be achieved for each VPN and/or across all the VPNs. After the optimal routing has been determined, the process goes to step 1012.

In step 1012, the process allocates the network resources based upon the optimal routing determined in prior steps and goes to step 1014. In step 1014, the process determines whether the customer has chosen to mark the data packets that are transmitted. If packet marking is desired, the process goes to step 1016; otherwise, the process goes to step 1018. In step 1016, the VPN service provider receives the packet marks chosen by the customer (or the VPN service provider provides the packet marks to the customer) and initializes the packet marks in the network nodes that are selected based on the optimal routing paths and goes to step 1018. In step 1018, the VPN service provider initializes the allocated network resources and commences the VPN process and goes to step 1020 and ends the initial network resource allocation process.

The VPN service provider may monitor VPN traffic to predict traffic rates so that SLAs for hoses 210–216 may be adjusted or resized to actual usage patterns. The access points 218–224 and/or other network nodes may monitor the incoming traffic to hoses 210–216 to collect hose traffic information as well as to ensure that the hose profiles are not violated. Similarly, traffic at a hose egress (i.e., traffic that has traversed the network) may be monitored for the same purposes.

Based on the information that is collected by the above monitoring, the VPN service provider may use network resource reservation mechanisms to resize current network resource allocations and provide prediction data for resizing the hose profile. Initially, the network resource allocations may be made statically by taking into account worst case resource demands. The initial allocations may then be resized dynamically based on monitoring measurements. The resizing of the allocation may be restrained by the hose profiles as specified in the SLAs such that the resizing cannot cause the hose capacity to fall below a level required to provide the required QOS requirements. However, when within the hose profiles, the resizing of the resource allocation allows more resources to be freed-up for use by other traffic and thus, more efficient use of the resources is possible. In addition, the hose profiles themselves may also be renegotiated based on the usage data generated based on the data produced by the monitoring process. The monitoring and resizing functions are discussed below in connection with an exemplary access point block diagram.

Figure 7:
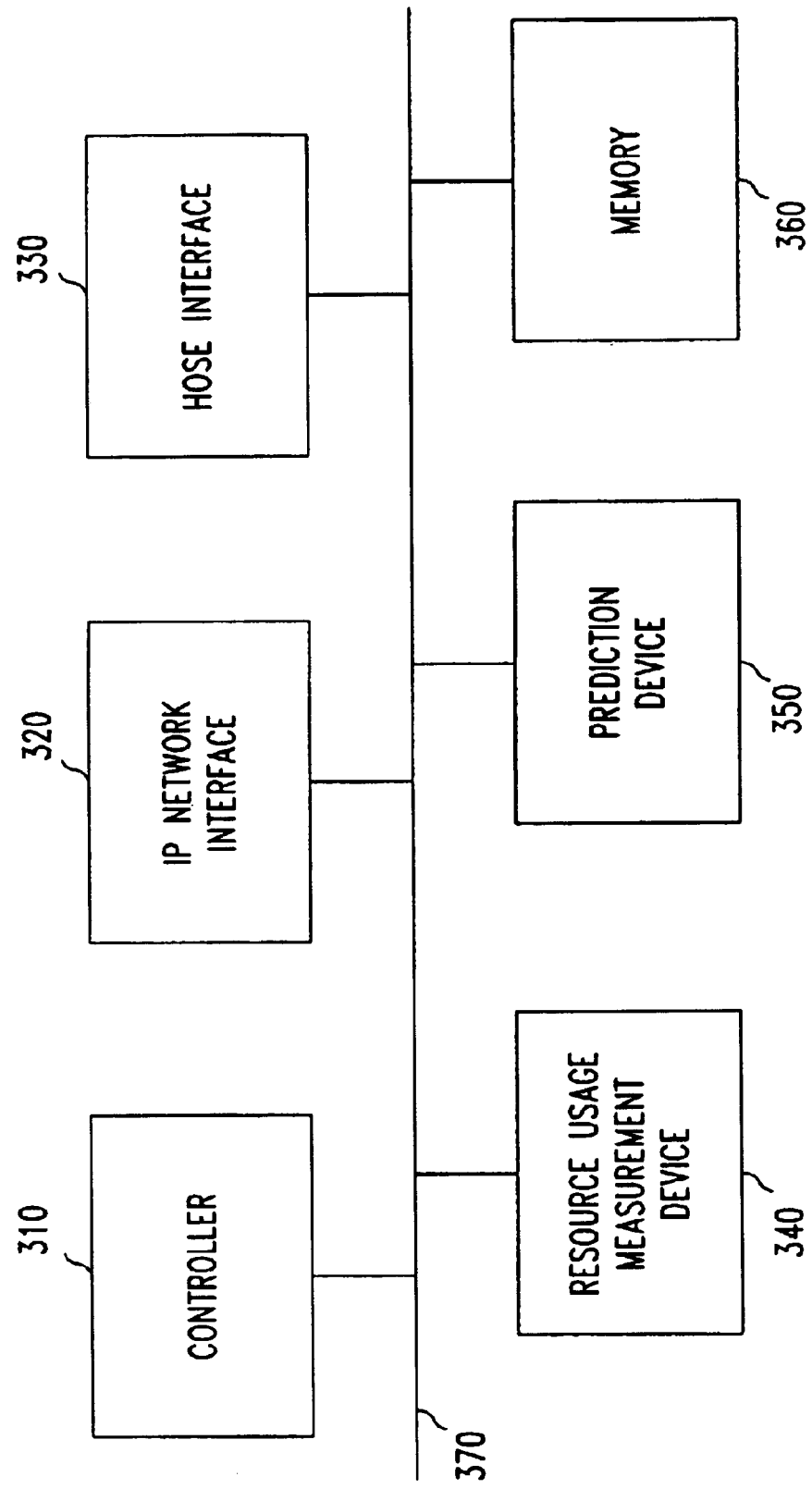
FIG. 7 is an exemplary block diagram of an access point.

FIG. 7 is an exemplary block diagram of an access point 218, for example. Although the access point 218 is described, it should be appreciated that the other access points 220–224 may have similar architecture. In addition, with the exception of the hose interface 330, FIG. 7 may also represent a node in the IP network 250. The access point 218 includes a controller 310, an IP network interface 320, a customer network interface 330, a resource usage measurement device 340, a memory 350 and a prediction device 360. These elements are coupled together via a signal bus 370. While a bus architecture is shown for ease of illustration, other architectures are possible, as is well known to one of ordinary skill.

When the customer network 202 requests a hose 210 for accessing a VPN, the access point 218 negotiates with the customer network 202 to determine an SLA to specify a hose profile for the hose 210. The successfully negotiated SLA is stored in the memory 350. The hose profile may include information related to the amount of traffic expected and the QOS(s) desired. The QOS may be a measure of data packet loss, delay, jitter and the like as discussed earlier. Other SLA parameters may be stored in the memory 350 and used to determine resizing of hose capacity as described hereafter.

Based on the hose profile, the access point 218 establishes the hose 210 between the customer network 210 and the VPN. The access point 218 may also communicate with other nodes of the IP network 250 to establish routing paths. As discussed earlier, various VPN network optimization schemes may be used. Thus, the access point 218 may perform management functions of the VPN service provider to establish and administer the VPN.

The traffic information transmitted over the hoses 210–216 may be data packets. Each data packet may include header information identifying the source, destination, data packet sequence number, QOS markings and the like. Based on the header information of the data packet, the controller 310 forwards the data packet via the IP network interface 320 to a next node or access points 220–224 in the IP network which may be determined by a routing scheme selected by the VPN service provider, such as shortest path or explicit routing path.

The access point 218 may perform monitoring functions by measuring current resource usage via the resource usage measurement device 340. For example, the resource usage measurement device 340 may measure the used bandwidth, packet loss, and/or other transmission parameters via direct measurement of the data stream, a standard network message protocol (SNMP) or other signaling interfaces such as the SS7. The resource usage measurements are then input to the prediction device 360 and used to predict hose capacity needed for the hose 210. Based on the predicted hose capacity, the controller 310 may renegotiate the capacity of the hose 210 to resize the hose 210 for greater network resource allocation efficiency. Other network resource allocations may also be dynamically resized based on the predictions generated by the prediction device 360.

As an example of a hose capacity prediction technique, traffic flow measurements gathered at regularly spaced instants during a window of duration $T_{meas}$ may be considered. The measurements may be used to predict an effective bandwidth for the traffic flow over some window of duration $T_{ren}$ following the measurement window.

The predicted effective bandwidth may be set to the maximum bandwidth measured during the measurement window $T_{meas}$. Alternatively, the predicted effective bandwidth may be set equal to $m+\alpha\sqrt{v}$, where m and v are respectively the mean and variance of the bandwidths sampled during the measurement window and α is a multiplier that controls the extent to which the negotiated bandwidth accommodates variability in the samples. The interpretation of a is that in a Gaussian approximation to the bandwidth distribution. The bandwidth $m+\alpha\sqrt{v}$ is expected to be exceeded with probability 1-G(α), where G is the cumulative distribution of the standard normal distribution.

If the interval between hose capacity renegotiations encompasses periods of systematic variation, the above predictions may become inaccurate. In order to remedy these inaccuracies, two approaches may be followed. First, a worst case predictor over the largest time scale of variation, e.g., the maximum bandwidth over a day for telephone traffic, may be used to compensate for inaccuracies. Second, historical data may be used to predict trends. For example, when average telephone call arrival rates are a known constant process Q(t), then instead of using a predicted bandwidth S(t) directly, the predictor $S(t)Q(t+T_{ren})/Q(t)$ may be used. Here, the ratio $Q(t+T_{ren})/Q(t)$ is used to model the systematic change of the arrival rate upwards or downwards.

In addition to the inaccuracies created by systematic variations, there are two statistical effects which, if uncorrected, may cause the prediction to underestimate bandwidth requirements. The first is sampling error and the second is short-time scale burstiness. Estimation of mean and variance is subject to inherent sampling error since the estimates are themselves random variable. This additional variability can lead to violation of target quality metrics if estimated parameters are assumed to be the true ones. The sampling error for n samples may be avoided by increasing the multiplier α to $\alpha'=((1+n)\ (\epsilon^{(\alpha^2)/n} -1))^{1/2} > \alpha$. For example, if n =60 and α=3, α'=3.14.

Burstiness at multiple time scales has been observed in Internet data traffic. The variability of the window averaged bandwidth of such traffic over a given window may increase for smaller window sizes. A predictor based on a given sampling window can underestimate the bandwidth required to satisfy the QOS of the SLA specified at shorter time scales. A prior knowledge of the scaling relations between bandwidth variance at different time scales can be used to correct the multiplier cc in order to accommodate short time scale variability.

Figure 8:
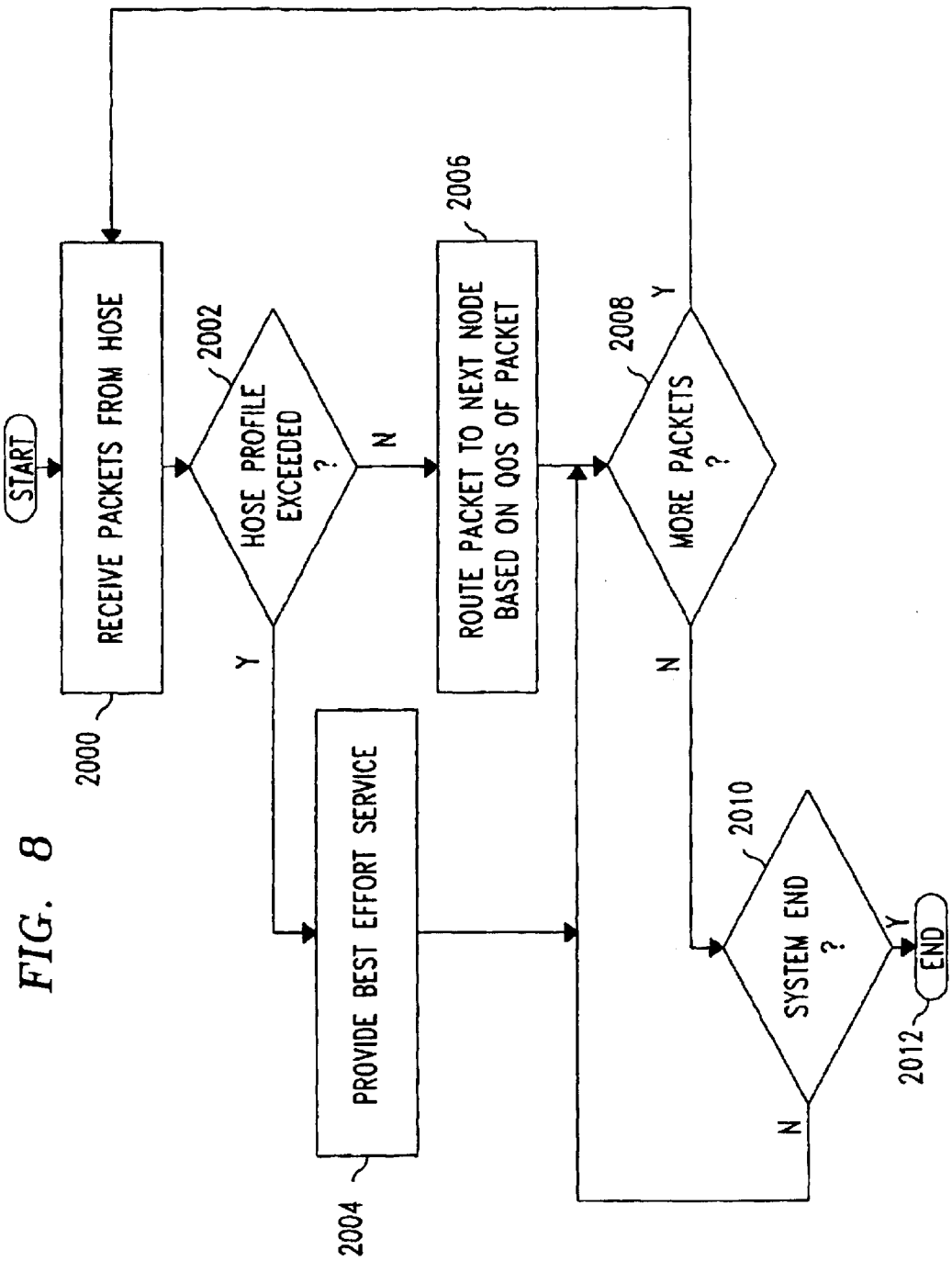
FIG. 8 is a flow chart of an exemplary access point process for handling data packets from a hose.

FIG. 8 shows a flow chart for an exemplary process of an access point 218–224 such as access point 218 for supporting a VPN. In step 2000, the hose interface 330 receives data packets from the hose 210 and goes to step 2002. In step 2002, the controller 310 determines whether the hose profile has been exceeded. If exceeded, the process goes to step 2004; otherwise, the process goes to step 2006. In step 2004, the controller 310 forwards the received data packet to the IP network interface 320 to be transmitted to the destination via a best effort service, for example. The best effort service may include dropping the data packet because network resources are not available for sending the data packet to its destination. Then, the process goes to step 2008. In step 2006, the controller 310 examines the data packet header to determine the QOS of the data packet and forwards the data packet to the next node 302 based on a routing path that is initialized when the VPN was established. Then the process goes to step 2008. In step 2008, the controller 310 determines whether more data packets have been received via the hose interface 330. If more data packets have been received, the process returns to step 2000; otherwise, the process goes to step 2010. In step 2010, the controller 310 determines whether a system end condition is detected. If detected, the process goes to step 2012 and ends; otherwise, the process returns to step 2008.

Figure 9:
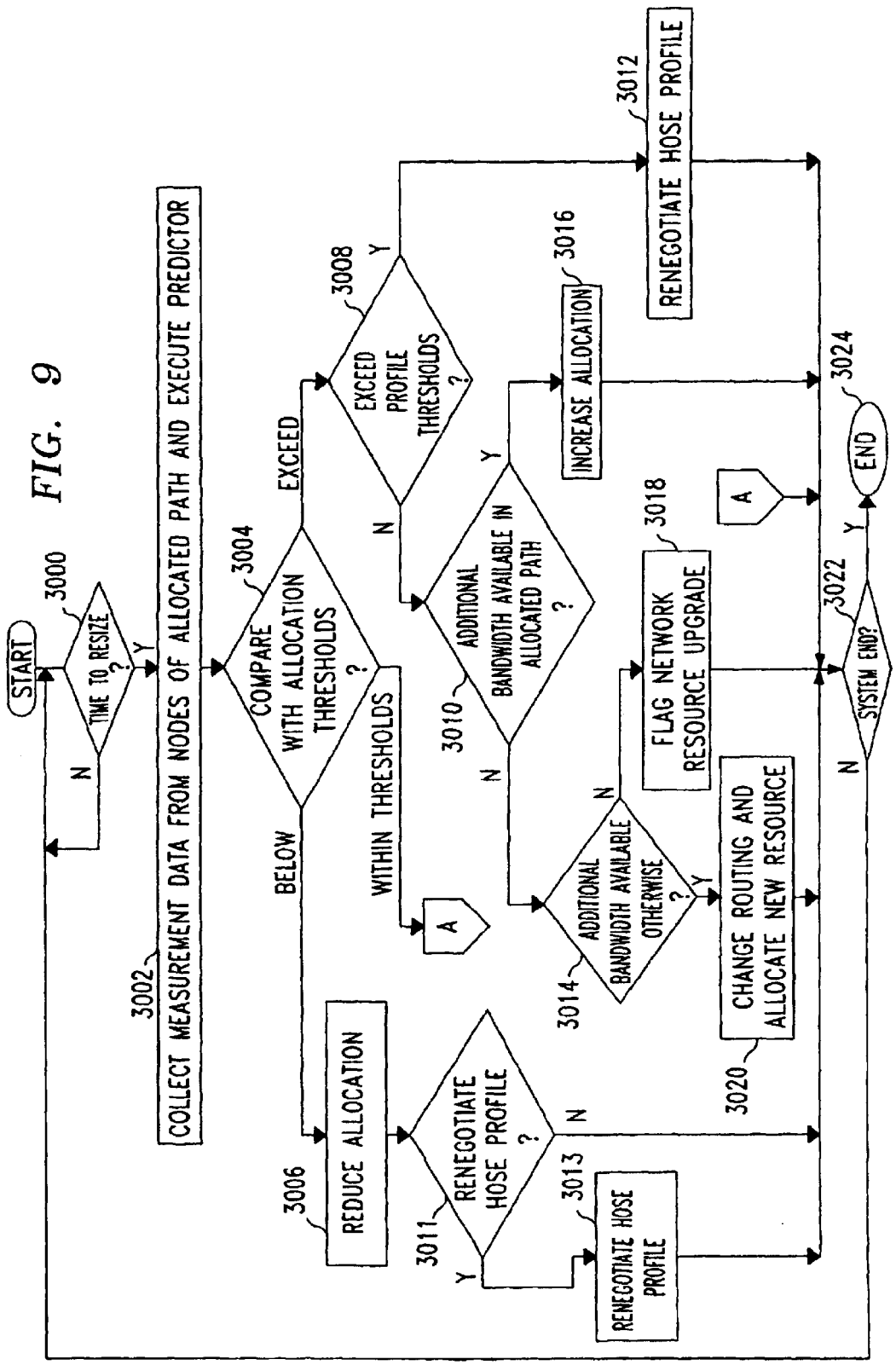
FIG. 9 is a flow chart of an exemplary process for resizing allocated network resources of a hose VPN.

FIG. 9 shows a flow chart for a monitoring process of the VPN service provider. In step 3000, the VPN service provider determines whether the time to determine whether resizing is necessary has been reached. If reached, the VPN service provider goes to step 3002; otherwise, the VPN service provider returns to step 3000. In step 3002, the VPN service provider collects measurement data from nodes 302 and/or access points 218–224 and optionally executes the traffic predictor via the prediction device 350, for example. Then the VPN service provider goes to step 3004. In step 3004, the VPN service provider compares the predicted traffic to allocated thresholds.

Multiple thresholds may be used. For example, when the predicted capacity exceeds an upper bound threshold, then additional capacity should be allocated for the VPN and the VPN service provider goes to step 3008. When the predicted capacity falls below a lower bound threshold, then the allocated resources should be reduced and the VPN service provider goes to step 3006. If the predicted capacity is between the upper bound and the lower bound thresholds, then the current resource allocation is acceptable and the VPN service provider goes to step 3022.

In step 3006, the VPN service provider reduces resource allocation of access points 218–224 and nodes 302 that are within the routing paths of the VPN and the VPN service provider goes to step 3011. In step 3011, the VPN service provider determines whether the hose profiles of the VPN should be renegotiated. If renegotiation is required, the VPN service provider goes to step 3013; otherwise, the VPN service provider goes to step 3022.

In step 3008, the VPN service provider determines whether the predicted capacity exceeds the hose profile thresholds. For example, thresholds may be set so that when the predicted capacity is within a predetermined value specified in the hose profile, then an alarm condition is set to determine whether the hose profile is required to be renegotiated. If the hose profile thresholds have been exceeded, the VPN service provider goes to step 3012; otherwise the VPN service provider goes to step 3010. In step 3012, the VPN service provider renegotiates the hose profiles to increase bandwidth and goes to step 3022.

In step 3010, the VPN service provider determines whether there is additional bandwidth within the nodes 302 and/or access points 218–224 of the routing path. If additional bandwidth is available, the VPN service provider goes to step 3016; otherwise, the VPN service provider goes to step 3014. In step 3016, the VPN service provider increases resource allocations based on the predictor capacities and goes to step 3022.

In step 3014, the VPN service provider determines whether additional bandwidth may be available in other nodes that may be a part of the routing path for the VPN. If available, the VPN service provider goes to step 3020; otherwise, the VPN service provider goes to step 3018. In step 3020, the VPN service provider changes the routing path of the VPN and allocates new resources so that the hose profile requirements may be met and goes to step 3022. In step 3018, the VPN service provider sets flags to indicate that network resource upgrades may be required due to excess demand for VPN services. Then the VPN service provider goes to step 3022. In step 3022, the VPN service provider determines whether a system end condition has been detected. If detected, the VPN service provider goes to step 3024 and ends the process; otherwise, the VPN service provider returns to step 3000.

The above described VPN service provider functions for establishing, managing and executing a VPN may be implemented by using a variety of available protocols such as the Integrated Service (IntServ), differentiated services (DiffServ), or Multi-Protocol Label Switching (MPLS) as defined in the Internet Engineering Task Force. For example, in an IntServ framework, a signaling protocol may be used to allocate resources for hoses 210–216 between selected endpoints on an as-needed basis. For this example, a customer network 202–208 may send signals via a signaling protocol to an access point 218–224 to establish a hose 210–216 and to identify endpoints of a VPN. The VPN service provider may respond by reserving resources within the IP network 250 by determining routing paths to the selected endpoints and setting up hoses 210–216 at each of the endpoints. The RSVP protocol may be used to maintain the resource reservations across the nodes of the established routing path. If the VPN that is established is no longer needed, the signaling via the RSVP protocol may be terminated resulting in releasing of the resources along the established routing path.

The DiffServ framework supports data packet marking so that various QOS levels may be implemented. The MPLS environment uses labels to place in the headers of data packets to determine routing paths that may be characterized by a sink tree. A sink tree is routed at a hose egress point and the branches extend to ingress points of other hoses 210–216. Such a sink tree may also be considered a label switch path (LSP) tree. For example, the VPN service provider may use traffic measurements to determine an actual spread of traffic from a hose egress point to several other hose ingress points and signal on each LSP involved to reserve the required resources. The signaling to create LSPs and to reserve reservations on such paths might be combined in a single protocol.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for providing a virtual private network service, comprising:

establishing a hose for each of a plurality of endpoints of a virtual private network, wherein the hose does not reference another endpoint of the virtual private network at establishment;

coupling the hose to endpoints associated with other hoses via routing paths in a network; and allocating network resources to support communications between the hose and the other hoses, wherein the establishing comprises specifying a service level agreement for the hose, the service level agreement including a hose profile and other information for controlling and managing the hose.

2. The method of claim 1, wherein the establishing comprises:
   first selecting one of a user managed hose type or a virtual private network service provider managed hose type for the hose; and
   second selecting whether to transmit marked data packets to the hose, results of the first and second selecting steps being stored in the hose profile.

3. The method of claim 2, wherein if the user managed hose type is selected, the method further comprising;
   specifying one or more aggregate bandwidths for the hose; and
   specifying a time schedule for each of the aggregate bandwidths, the
   aggregate bandwidths and the time schedule being stored in the hose profile.

4. The method of claim 3, wherein if data packet marking is selected, the method further comprising:
   receiving information regarding data packet markings and a quality of service corresponding to each of the data packet markings; and
   initializing the allocated network resources to provide the quality of service based on the data packet markings if conditions in the hose profile is not violated.

5. The method of claim 2, wherein if the virtual service provider managed hose type is selected, the method further comprising:
   receiving one or more quality of service levels for the hose;
   establishing one or more sub-virtual private networks, each sub-virtual network corresponding to one of the quality of service levels;
   specifying one or more bandwidths for the hose corresponding to each of the sub-virtual private networks; and
   specifying one or more time schedules for the bandwidths, the bandwidths and the time schedules being stored in the hose profile.

6. The method of claim 5, wherein if data packet marking is selected, the method further comprising:
   receiving information regarding data packet markings and a quality of service corresponding to each of the data packet markings; and
   initializing the allocated network resources to provide the quality of service based on the data packet markings if conditions in the hose profile is not violated.

7. The method of claim 1, further comprising:
   measuring communication traffic of allocated network resources to generate monitoring data;
   generating a resizing condition based on the monitoring data; and
   resizing the allocated network resources if the resizing condition is within one or more thresholds of the hose profile.

8. The method of claim 7, wherein the monitored data includes historical data, the method further comprising generating trend data to predict virtual private network usage.

9. The method of claim 7, wherein the resizing condition is one of above an upper bound threshold, below a lower bound threshold, and within the upper bound and lower bound thresholds.

10. The method of claim 9, further comprising:
    reducing the allocated network resources if the resizing condition is below the lower bound threshold; and
    increasing the allocated network resources if the resizing condition is above the upper bound threshold.

11. The method of claim 9, wherein if the resizing condition is below the lower bound threshold by a predetermined amount, the method further comprising renegotiating the hose profile to change the service level agreement to be more consistent with the monitored data.

12. The method of claim 9, wherein if the resizing condition is above limits set by the hose threshold, the method further comprising renegotiating the hose profile to change the service level agreement to be more consistent with the monitored data.

13. The method of claim 7, wherein the resizing condition determined based on a prediction of future virtual private network usage.

14. A virtual private network in a network, comprising:
    a plurality of endpoints, each of the endpoints having a hose, wherein the hose does not reference another endpoint of the virtual private network at establishment; and
    a plurality of routing paths in the network, the routing paths coupling the hose to endpoints associated with other hoses; and
    a virtual private network service provider; the virtual private network service provider allocating network resources to support communications between the hose and the other hoses,
    wherein the virtual private network service provider receives a service level agreement for the hose, the service level agreement including a hose profile and other information for controlling and managing the hose.

15. The virtual private network of claim 14, wherein the virtual private network service provider receives a first selection of one of a user managed hose type or a virtual private network service provider managed hose type for the hose and a second selection of whether to transmit marked data packets to the hose, results of the first and second selections being stored in the hose profile.

16. The virtual private network of claim 15, wherein if the user managed hose type is selected, the virtual private network service provider receives a specification forgone or more aggregate bandwidths for the hose, and a specification for a time schedule for each of the aggregate bandwidths, the aggregate bandwidths and the time schedule being stored in the hose profile.

17. The virtual private network of claim 16, wherein if data packet marking is selected, the virtual private network service provider receives information regarding data packet markings and a quality of service corresponding to each of the data packet markings and initializes the allocated network resources to provide the quality of service based on the data packet markings if conditions in the hose profile is not violated.

18. The virtual private network of claim 15, wherein if the virtual service provider managed hose type is selected, the virtual private network service provider receives one or more quality of service levels for the hose, establishes one or more sub-virtual private networks, each sub-virtual network corresponding to one of the quality of service levels, receives a specification of one or more bandwidths for the hose corresponding to each of the sub-virtual private networks, and receives a specification of one or more time schedules for the bandwidths, the bandwidths and the time schedules being stored in the hose profile.

19. The virtual private network of claim 18, wherein if data packet marking is selected, the virtual private network service provider receives information regarding data packet markings and a quality of service corresponding to each of the data packet markings, and initializes the allocated network resources to provide the quality of service based on the data packet markings if conditions in the hose profile is not violated.

20. The virtual private network of claim 14, wherein the virtual private network service provider measures communication traffic of allocated network resources to generate monitoring data, generates a resizing condition based on the monitoring data, and resizes the allocated network resources if the resizing condition is within thresholds of the hose profile.

21. The virtual private network of claim 20, wherein the monitored data includes historical data, the method further comprising generating trend data to predict virtual private network usage.

22. The virtual private network of claim 20, wherein the resizing condition is one of above an upper bound threshold, below a lower bound threshold, and within the upper bound and lower bound thresholds.

23. The virtual private network of claim 22, wherein the virtual private network service provider reduces the allocated network resources if the resizing condition is below the lower bound threshold, and increases the allocated network resources if the resizing condition is above the upper bound threshold.

24. The virtual private network of claim 22, wherein if the resizing condition is below the lower bound threshold by a predetermined amount, the method further comprising renegotiating the hose profile to change the service level agreement to be more consistent with the monitored data.

25. The virtual private network of claim 22, wherein if the resizing condition is above limits set by the hose threshold, the method further comprising renegotiating the hose profile to change the service level agreement to be more consistent with the monitored data.

26. The virtual private network of claim 20, wherein the resizing condition determined based on a prediction of future virtual private network usage.

27. The virtual private network of claim 26, wherein the virtual private network service provider selects the routing paths based on a shortest distance between pairs of endpoints of the virtual private network to form a pipe between the pairs of the endpoints.

28. The virtual private network of claim 26, wherein the virtual private network service provider selects the routing paths based on a source tree or a sink tree for each of the endpoints, and minimizes a bandwidth allocation between nodes of the network by maximizing sharing of same paths for branches of the source or the sink tree extending between different ones of the endpoints.

29. The virtual private network of claim 26, wherein the virtual private network service provider selects the routing paths based on source trees or sink trees corresponding to all endpoints of the virtual private network, and minimizes a bandwidth allocation between nodes of the network by maximizing sharing of same paths for branches of the source or the sink trees extending between different ones of the endpoints.

30. The virtual private network of claim 26, wherein the virtual private network service provider selects the routing paths based on source trees or sink trees corresponding to all endpoints of one or more virtual private networks, and minimizes a bandwidth allocation between nodes of the network by maximizing sharing of same paths for branches of the source or the sink trees extending between different ones of the endpoints for all the virtual private networks.

* * * * *